United States Patent
Halsey et al.

(10) Patent No.: US 10,901,105 B2
(45) Date of Patent: Jan. 26, 2021

(54) METHOD AND SYSTEM FOR REGRESSION AND CLASSIFICATION IN SUBSURFACE MODELS TO SUPPORT DECISION MAKING FOR HYDROCARBON OPERATIONS

(71) Applicants: Thomas C. Halsey, West University Place, TX (US); Xiaohui Wu, Sugar Land, TX (US); Sumeet Trehan, The Woodlands, TX (US)

(72) Inventors: Thomas C. Halsey, West University Place, TX (US); Xiaohui Wu, Sugar Land, TX (US); Sumeet Trehan, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 327 days.

(21) Appl. No.: 15/851,323

(22) Filed: Dec. 21, 2017

(65) Prior Publication Data

US 2018/0188403 A1 Jul. 5, 2018

Related U.S. Application Data

(60) Provisional application No. 62/591,576, filed on Nov. 28, 2017, provisional application No. 62/440,134, filed on Dec. 29, 2016.

(51) Int. Cl.
| | | |
|---|---|---|
| *E21B 41/00* | (2006.01) | |
| *G01V 1/50* | (2006.01) | |
| *G01V 1/30* | (2006.01) | |
| *E21B 49/00* | (2006.01) | |
| *E21B 43/30* | (2006.01) | |
| *G06F 17/18* | (2006.01) | |

(52) U.S. Cl.
CPC ............. *G01V 1/50* (2013.01); *E21B 41/00* (2013.01); *G01V 1/306* (2013.01); *E21B 43/30* (2013.01); *E21B 49/005* (2013.01); *E21B 2200/22* (2020.05); *G06F 17/18* (2013.01)

(58) Field of Classification Search
CPC ........ G01V 99/00; G01V 99/005; G01V 1/48; G06F 30/20
See application file for complete search history.

(56) References Cited

U.S. PATENT DOCUMENTS

| | | |
|---|---|---|
| 7,725,302 B2 | 5/2010 | Ayan et al. |
| 9,074,454 B2 | 7/2015 | Crick et al. |
| 9,135,378 B2 | 9/2015 | Le Ravalec |
| 2007/0016389 A1 | 1/2007 | Ozgen |

(Continued)

OTHER PUBLICATIONS

Breiman, L. (2001), "Random forests", Machine learning, 45(1), pp. 5-32.

(Continued)

*Primary Examiner* — Kandasamy Thangavelu
(74) *Attorney, Agent, or Firm* — ExxonMobil Upstream Research Company Law Department

(57) ABSTRACT

A method and system are described for hydrocarbon exploration, development and production. The method relates to performing regression and/or classification in subsurface models to support decision making for hydrocarbon operations. The evaluation may then be used in performing hydrocarbon operations, such as hydrocarbon exploration, hydrocarbon development and/or hydrocarbon production.

17 Claims, 6 Drawing Sheets

(56) References Cited

U.S. PATENT DOCUMENTS

| | | | |
|---|---|---|---|
| 2012/0215511 A1 | 8/2012 | Sarma et al. | |
| 2015/0066373 A1* | 3/2015 | Al-Nahdi | E21B 47/06 |
| | | | 702/13 |
| 2015/0153476 A1* | 6/2015 | Prange | G06F 30/20 |
| | | | 703/2 |
| 2016/0103245 A1* | 4/2016 | Pyrcz | G01V 99/005 |
| | | | 703/2 |
| 2016/0245953 A1* | 8/2016 | Al-Nahdi | G01V 99/005 |
| 2017/0017883 A1* | 1/2017 | Zhou | E21B 43/00 |
| 2018/0031720 A1* | 2/2018 | Etiene Queiroz | G01V 1/48 |
| 2018/0321421 A1* | 11/2018 | Halabe | G01V 99/005 |
| 2019/0120022 A1* | 4/2019 | Zanon | E21B 43/00 |
| 2019/0293835 A1* | 9/2019 | Kauerauf | G01V 99/00 |
| 2020/0124753 A1* | 4/2020 | Halsey | G01V 1/306 |

OTHER PUBLICATIONS

Jiang et al. (2016) "Scenario Discovery Workflow for Robust Petroleum Reservoir Development under Uncertainty", International Journal for Uncertainty Quantification, 6(6), pp. 533-559.

Friedman et al. (2001), "Basis Expansions and Regularization, The Elements of Statistical Learning", vol. 1. Springer, Berlin: Springer series in statistics, pp. 115-163.

Friedman et al. (2001), "Unsupervised Learning, The Elements of Statistical Learning", vol. 1. Springer, Berlin: Springer series in statistics, pp. 437-508.

Oliver et al.—cont. (2008) "9 Sensitivity coefficients", Inverse Theory for Petroleum Reservoir Characterization and History Matching, Cambridge University Press, pp. 200-268.

Oliver et al.—cont. (2008) "10 Quantifying uncertainty", Inverse Theory for Petroleum Reservoir Characterization and History Matching, Cambridge University Press, pp. 269-346.

Oliver et al.—cont. (2008) "11 Recursive methods", Inverse Theory for Petroleum Reservoir Characterization and History Matching, Cambridge University Press, pp. 347-359.

Ramsay et al. (2006), "Functional data analysis", John Wiley & Sons, Inc., pp. 1-10; 37-66; 85-136; and 257-268.

Spantini et al. (2017) "Goal-Oriented Optimal Approximations of Bayesian Linear Inverse Problems", SIAM Journal on Scientific Computing, vol. 39, No. 5, pp. S167-S196.

Scheidt et al. (2015) "Prediction-focused subsurface modeling: Investigating the need for accuracy in flow-based inverse modeling", Mathematical Geosciences, vol. 47, Issue 2, pp. 173-191.

Sun et al. (2017) "A New Data-Space Inversion Procedure for Efficient Uncertainty Quantification in Subsurface Flow Problems", Mathematical Geosciences, vol. 49, pp. 679-715.

Suzuki et al., (2015) "Using Association Rule Mining and High-Dimensional Visualization to Explore the Impact of Geological Features on Dynamic Flow Behavior." SPE Annual Technical Conference and Exhibition, Society of Petroleum Engineers, 2015, SPE174774, pp. 1-32.

Trehan et al. (2017) "Goal-oriented Inference as Machine Learning Problem", poster displayed at Nov. 29, 2017 meeting.

Aster, R.C. et al. (2011) "Parameter Estimation and In-verse Problems," vol. 90, Academic Press, p. 1-292.

Badru, O. (2003) "Well-Placement Optimization Using The Quality Map Approach", A report submitted to the Department of Petroleum Engineering of Stanford University in Partial Fulfillment of the Requirements for the Degree of Master of Science, pp. 1-62.

Breiman, L., et al. (2015) "Package Random Forest version 4.6-12", URL https://cran.r-project.org/web/packages/randomForest/randomForest.pdf, pp. 1-29.

Candès, E. J., et al. (2011) "Robust Principal Component Analysis," Journal of the ACM, vol. 58, No. 3, pp. 11:1-11:37.

Da Cruz et al. (2004) "The Quality Map: A Tool for Reservoir Uncertainty Quantification and Decision Making", paper SPE 87642, SPE Reservoir Evaluation & Engineering, pp. 6-14.

Fenwick, D., et al. (2014) "Quantifying Asymmetric-Parameter Interactions in Sensitivity Analysis: Application to Reservoir Modeling," Mathematical Geosciences, vol. 46, No. 4, pp. 493-511.

Gao, G., et al. (2004) "An Improved Implementation of the LBFGS Algorithm for Automatic History Matching," SPE-90058-MS, SPE Annual Technical Conference and Exhibition, Society of Petroleum Engineers, pp. 2496-2504.

Gu, Y., et al. (2007) "An Iterative Ensemble Kalman Filter for Multiphase Fluid Flow Data Assimilation," SPE Journal, vol. 12, No. 4, pp. 438-446.

Krishnamurti, T.N., et al. (2000) "Multimodel Ensemble Forecasts for Weather and Seasonal Climate," Journal of Climate, vol. 13, No. 23, pp. 4196-4216.

Mallet, V., et al. (2009) "Ozone Ensemble Forecast with Machine Learning Algorithms," Journal of Geophysical Research: Atmospheres, vol. 114, Issue D5, pp. 1-13.

Park, J. (2016) Manual for DGSA (Distance based global sensitivity analysis) Matlab toolbox, pp. 1-24.

Sarma, et al. (2006) "Efficient Real-Time Reservoir Management Using Adjoint-Based Optimal Control and Model Updating", Computational Geosciences, vol. 10, Issue 1, pp. 3-36.

Tarantola, A. (2005) "Inverse Problem Theory and Methods for Model Parameter Estimation", SIAM, vol. 89, Table of Contents, pp. i-xii.

A—Tarantola (2005) The General Discrete Inverse Problem, pp. 1-40.

B—Tarantola (2005) Monte Carlo Methods, pp. 41-55.

C—Tarantola (2005) The Least Squares Criterion, pp. 57-80.

D—Tarantola (2005) Chapter 4, Least Absolute Values Criterion and Minimax Criterion, pp. 81-99.

E—Tarantola (2005) Chapter 5, Functional Inverse Problems, pp. 101-158.

F—Tarantola (2005) Chapter 6, Appendices, pp. 159-251.

G—Tarantola (2005) Chapter 7, Problems, pp. 253-316.

H—Tarantola (2005) References, pp. 317-342.

Xu, et al. (2012) "Robust PCA via Outlier Pursuit", IEEE Transactions on Information Theory, vol. 58, No. 5, pp. 3047-3064.

\* cited by examiner

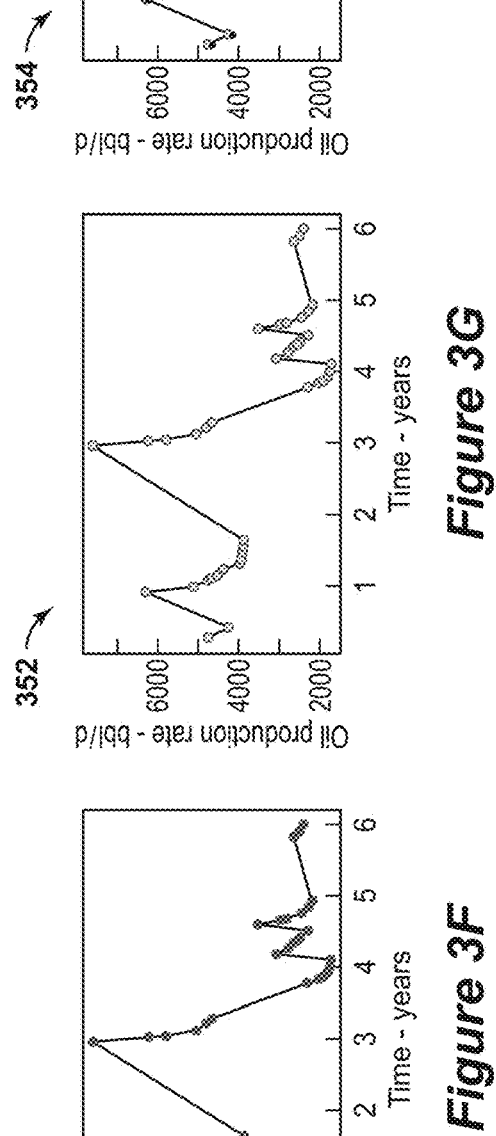
*Figure 3F*
*Figure 3G*
*Figure 3H*
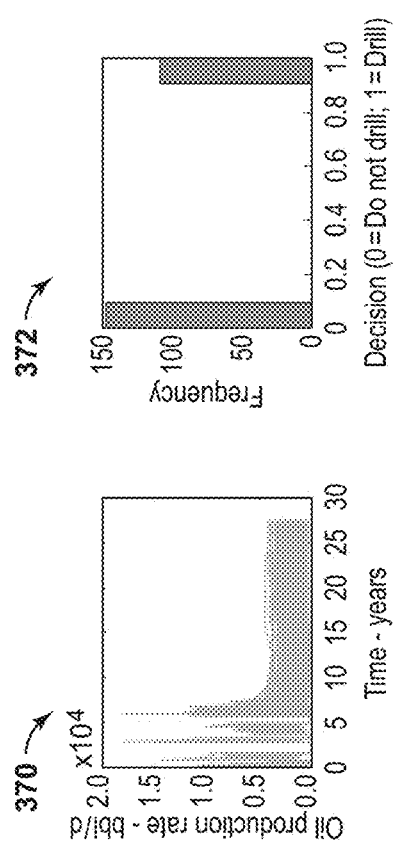
*Figure 3J*
*Figure 3K*
*Figure 3L*
*Figure 3M*

METHOD AND SYSTEM FOR REGRESSION AND CLASSIFICATION IN SUBSURFACE MODELS TO SUPPORT DECISION MAKING FOR HYDROCARBON OPERATIONS

CROSS-REFERENCE TO RELATED APPLICATION

This application claims the benefit of U.S. Provisional Patent Application 62/440,134 filed Dec. 29, 2016 entitled METHOD AND SYSTEM FOR REGRESSION AND CLASSIFICATION IN SUBSURFACE MODELS TO SUPPORT DECISION MAKING FOR HYDROCARBON OPERATIONS, and U.S. Provisional Patent Application 62/591,576 filed Nov. 28, 2017 entitled METHOD AND SYSTEM FOR REGRESSION AND CLASSIFICATION IN SUBSURFACE MODELS TO SUPPORT DECISION MAKING FOR HYDROCARBON OPERATIONS the entirety of which are incorporated by reference herein.

FIELD OF THE INVENTION

This disclosure relates generally to the field of hydrocarbon exploration, development and production and, more particularly, to subsurface modeling. Specifically, the disclosure relates to a method for regression and classification in subsurface models to support decision making for hydrocarbon operations. The resulting enhancements may then be used in performing hydrocarbon operations, such as hydrocarbon exploration, hydrocarbon development and/or hydrocarbon production.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

In exploration, development and/or production stages for resources, such as hydrocarbons, different types of subsurface models may be used to represent the subsurface structures, which may include a description of subsurface structures and material properties for a subsurface region. For example, the subsurface model may be a geologic model or a reservoir model. The subsurface model may represent measured data and/or interpreted data for the subsurface region, may be within a physical space or domain, and may include objects (e.g., horizons, faults, surfaces, volumes, and the like). The subsurface model may also be discretized with a mesh or a grid that includes nodes and forms cells (e.g., voxels or elements) within the model. The geologic model may represent measured or interpreted data for the subsurface region, such as seismic data and well log data, and may have material properties, such as rock properties. The reservoir model may be used to simulate flow of fluids within the subsurface region. Accordingly, the reservoir model may use the same mesh and/or cells as other models, or may resample or upscale the mesh and/or cells to lessen the computations for simulating the fluid flow.

The development of the subsurface model, such as a reservoir model or a geologic model, may be problematic. Subsurface modeling is utilized in hydrocarbon development and hydrocarbon production phases for hydrocarbon assets. Hydrocarbon development involves determining capital and operating decisions, which relate to the plans for production from an asset. During such stages, one or more subsurface models are created, which are conditioned to seismic data, well logs, well test data, and any other available data to determine the underlying geological and statistical concepts for the subsurface region. In particular, history matching is utilized in conventional approaches to manage production from an asset. History matching utilizes production data, such as flow rates, pressure data and/or temperature data, to condition the reservoir model and determine the reservoir model that matches the measured data. The assimilation of this data is utilized with a reservoir model to provide a more accurate future prediction based on the past production data.

By way of example, various approaches have been developed to perform this type of modeling. For example, U.S. Patent Application No. 200079916389 describes a method for performing history matching using a neural network. The neural network provides a correlation between the calculated history match error and a selected set of parameters that characterize the well bore and/or the reservoir. The neural network iteratively varies the value of the parameters to provide at least one set of history match parameters having a value that provides a minimum for the calculated history matching error. Thus, the method is directed to minimizing the history match error.

As another example, U.S. Pat. No. 7,725,302 describes a method for performing an oilfield operation using a user objective. In the method, a one-dimensional (1D) reservoir model is generated and a three dimensional (3D) reservoir model is generated by distributing properties per unit of depth in the volume. Then, the 3D reservoir model is calibrated using historical response of the reservoir, thereby assisting the forecast of the response of the reservoir to a set of input data by applying the set of input data to the 3D reservoir model.

As yet another example, U.S. Pat. No. 9,074,454 describes a method for performing reservoir engineering using horizons and positioning wellbore equipment in a well completion design based on an offset. Then, the method further includes calculating an absolute position of the wellbore equipment in the well completion design based on the offset and the location of the geological horizon.

Further, U.S. Pat. No. 9,135,378 describes a method of developing a reservoir traversed using a production indicator. In the method, a position of a well to be drilled is determined by means of a production indicator map. The method involves determining production indicators on a group of cells; determining production indicators on another group of cells; and interpolating production indicators for the other cells of the map. Then, the new well is positioned at the highest production indicator.

Other references related to history matching include Oliver et al., "Inverse theory for petroleum reservoir characterization and history matching", Cambridge University Press, 2008. This reference describes the use of inverse theory for estimation and conditional simulation of flow and transport parameters in porous media. Further, the reference describes the use of the theory and practice of estimating properties of underground petroleum reservoirs from measurements of flow in wells.

The reservoir model optimization approach merely addresses a conditioning problem that determines the reservoir model that best matches the historical production data. Yet, the history matching process has to rely upon noisy production data to determine the model that best matches the historical data. As a result, history matching, which is limited in properly determining the subsurface structures within the reservoir, has evolved to include ensembles of reservoir models to address this deficiency. The ensemble of models still rely upon the noisy production data to attempt to provide insights on the reservoir model (or models, within the full ensemble). Further, the reservoir model may be underdetermined by the data, and as a result, a unique optimal solution may not exist for the data being used in the history matching approach. Typically, this approach has the goal to select a model or models to use in the performance of further modeling, in support of some business objective. However, this approach may reduce the number or range of the models being reviewed, which may limit the number of models to a narrower or constricted range and/or may not necessarily be suited for assisting in decision making processes. In addition, the process of determining a model that matches the historical production data is time-consuming and cumbersome within the reservoir modeling and software systems currently practiced.

Accordingly, there remains a need in the industry for methods and systems that are more efficient and may lessen problems associated with using production data in hydrocarbon operations, in particular, to provide support for decision making for hydrocarbon operations, which may be utilized to enhance hydrocarbon operations, such as hydrocarbon exploration, hydrocarbon development and/or hydrocarbon production. The present techniques provide a method and apparatus that overcome one or more of the deficiencies discussed above.

SUMMARY

In one embodiment, a method for evaluating and performing a hydrocarbon operation for a subsurface region is described. The method comprising: obtaining a first data set associated with a subsurface region, wherein the two or more reservoir models are based on a first data set; creating two or more reservoir models for a subsurface region from the first data set; obtaining a second data set associated with a subsurface region and the two or more reservoir models; maybe obtaining production data associated with a subsurface region; disposing the production data or at least a portion of the production data and/or the second data set or at least a portion of the second data set into a feature space; determining a region of interest within the feature space; evaluating the region of interest in the feature space; and determining whether to perform a hydrocarbon operation based on the evaluation of the region of interest.

The method may include various enhancements. For example, the method may include performing one or more regression techniques to evaluate the metric or metrics in the region of interest; wherein the first data set comprises one of seismic data, well test data, well log data and any combination thereof; wherein the second data set comprises one of generated or observed seismic data, generated or observed well test data, generated or observed well log data, generated or observed production data and any combination thereof; simulating each of the two or more reservoir models with the hydrocarbon operation being performed to create first simulation results, simulating each of the two or more reservoir models with the hydrocarbon operation not being performed to create second simulation results; wherein the second data set includes the first simulation results and the second simulation results; transforming the second data set to alter (e.g., lessen) dimensionality of at least a portion of the second data set prior to disposing the second data set, or a portion of the second data set, into the feature space; and/or wherein the hydrocarbon operation may comprise adding a new well to access the subsurface region.

In another embodiment, a system for evaluating and performing a hydrocarbon operation for a subsurface region is described. The system may include a processor; an input device in communication with the processor and configured to receive input data associated with a subsurface region; memory in communication with the processor, the memory having a set of instructions. The set of instructions, when executed by the processor, are configured to: obtain a first data set associated with a subsurface region, wherein the two or more reservoir models are based on a first data set; create two or more reservoir models for a subsurface region from the first data set; obtain a second data set associated with a subsurface region and the two or more reservoir models; may obtain production data associated with a subsurface region; dispose the production data or at least a portion of the production data and/or the second data set or at least a portion of the second data set into a feature space; determine a region of interest within the feature space; evaluate the region of interest in the feature space; and determine whether to perform a hydrocarbon operation based on the evaluation of the region of interest.

The system may include various enhancements. For example, the system may include the set of instructions, when executed by the processor, configured to: perform one or more regression techniques to evaluate the region of interest; wherein the first data set comprises one of seismic data, well test data, well log data and any combination thereof; wherein the second data set comprises one of generated or observed seismic data, generated or observed well log data, generated or observed well test data, generated or observed production data and any combination thereof; simulate each of the two or more reservoir models with the hydrocarbon operation being performed to create first simulation results, simulate each of the two or more reservoir models with the hydrocarbon operation not being performed to create second simulation results, wherein the second data set includes the first simulation results and the second simulation results; simulate each of the two or more reservoir models with the hydrocarbon operation being performed to create simulation results; wherein the second data set comprises the first simulation results and the second simulation results; transforming the second data set to alter, or preferably lessen, dimensionality of the feature space, prior to disposing the second data set, or a portion of the second data set into the feature space; wherein the hydrocarbon operation comprises adding a new well to access the subsurface region.

In yet another embodiment, a method for evaluating and performing a hydrocarbon operation for a subsurface region is described. The method comprises: obtaining a first data set associated with a subsurface region, wherein the two or more reservoir models are based on a first data set; obtaining a metric for an operational decision; creating two or more reservoir models for a subsurface region from the first data set; obtaining a second data set associated with a subsurface region and the two or more reservoir models; creating a feature space and defining a plurality of elements of the feature space corresponding to each reservoir model; disposing the second data set or a portion of the second data set into a feature space; determining a region of interest within the feature space; evaluating the metric for the operational decision at the region of interest in the feature space; and determining whether to perform a hydrocarbon operation based on the evaluation of the metric for the operational decision at the region of interest.

In other embodiments, the method may include enhancements. The method may further comprise performing one or more mathematical, statistical, or machine learning techniques combined with reservoir model simulation data, model-form error and metrics to evaluate a metric in the region of interest; wherein the first data set comprises one of seismic data, well log data, well test data, production data and any combination thereof; wherein the second data set comprises one of generated or observed seismic data, generated or observed well test data, generated or observed well log data, generated or observed production data, and any combination thereof; further comprising: simulating each of the two or more reservoir models to create simulation results, wherein the second data set comprises the simulation results; further comprising: simulating each of the two or more reservoir models with the hydrocarbon operation being performed to create first simulation results; simulating each of the two or more reservoir models with the hydrocarbon operation not being performed to create second simulation results, wherein the decision metric is determined from the first simulation results and the second simulation results; further comprising transforming the second data set to alter dimensionality of the second data set, or a portion of the second data set, in the feature space; wherein the hydrocarbon operation comprises adding a new well to access the subsurface region; wherein the second data set comprises one of observed or generated well log and observed or generated well test data from appraisal wells and/or wherein the metric of operational decision is used to determine fidelity of the reservoir models.

In still yet another embodiment, a system for evaluating and performing a hydrocarbon operation for a subsurface region is described. The system comprising: a processor; an input device in communication with the processor and configured to receive input data associated with a subsurface region; memory in communication with the processor, the memory having a set of instructions, wherein the set of instructions, when executed by the processor, are configured to: obtain a first data set associated with a subsurface region, wherein the two or more reservoir models are based on a first data set; create two or more reservoir models for a subsurface region from the first data set; obtain a second data set associated with a subsurface region and the two or more reservoir models; obtain production data associated with a subsurface region; dispose the production data or at least a portion of the production data and the second data set or at least a portion of the second data set into a feature space; determine a region of interest within the feature space; evaluate a decision metric in the region of interest in the feature space; and determine whether to perform a hydrocarbon operation based on the evaluation of the decision metric at or in the neighborhood of the region of interest.

In other embodiments, the system may include various enhancements. The system may include the set of instructions, that when executed by the processor, are further configured to: perform one or more regression techniques to evaluate the region of interest; wherein the first data set comprises one of seismic data, well log data, well test data, production data and any combination thereof; wherein the second data set comprises one of generated or observed seismic data, generated or observed well log data, generated or observed well test data, generated or observed production data and any combination thereof; wherein the set of instructions, when executed by the processor, are further configured to simulate each of the two or more reservoir models to create simulation results, wherein the second data set comprises the simulation results; wherein the set of instructions, when executed by the processor, are further configured to simulate each of the two or more reservoir models with the hydrocarbon operation being performed to create first simulation results, simulate each of the two or more reservoir models with the hydrocarbon operation not being performed to create second simulation results, wherein the decision metric is determined from the first simulation results and the second simulation results; further comprising transforming the second data set to alter the dimensionality of the second data set, or a portion of the second data set, in the feature space; further comprising transforming the second data set to incorporate additional information corresponding to later times prior to disposing the second data set, or a portion of the second data set, into the feature space; and/or wherein the hydrocarbon operation comprises adding a new well to access the subsurface region.

BRIEF DESCRIPTION OF THE DRAWINGS

The advantages of the present invention are better understood by referring to the following detailed description and the attached drawings.

FIGS. 3A to 3M are exemplary diagrams associated with an embodiment of the present techniques.

DETAILED DESCRIPTION

Figure 1:
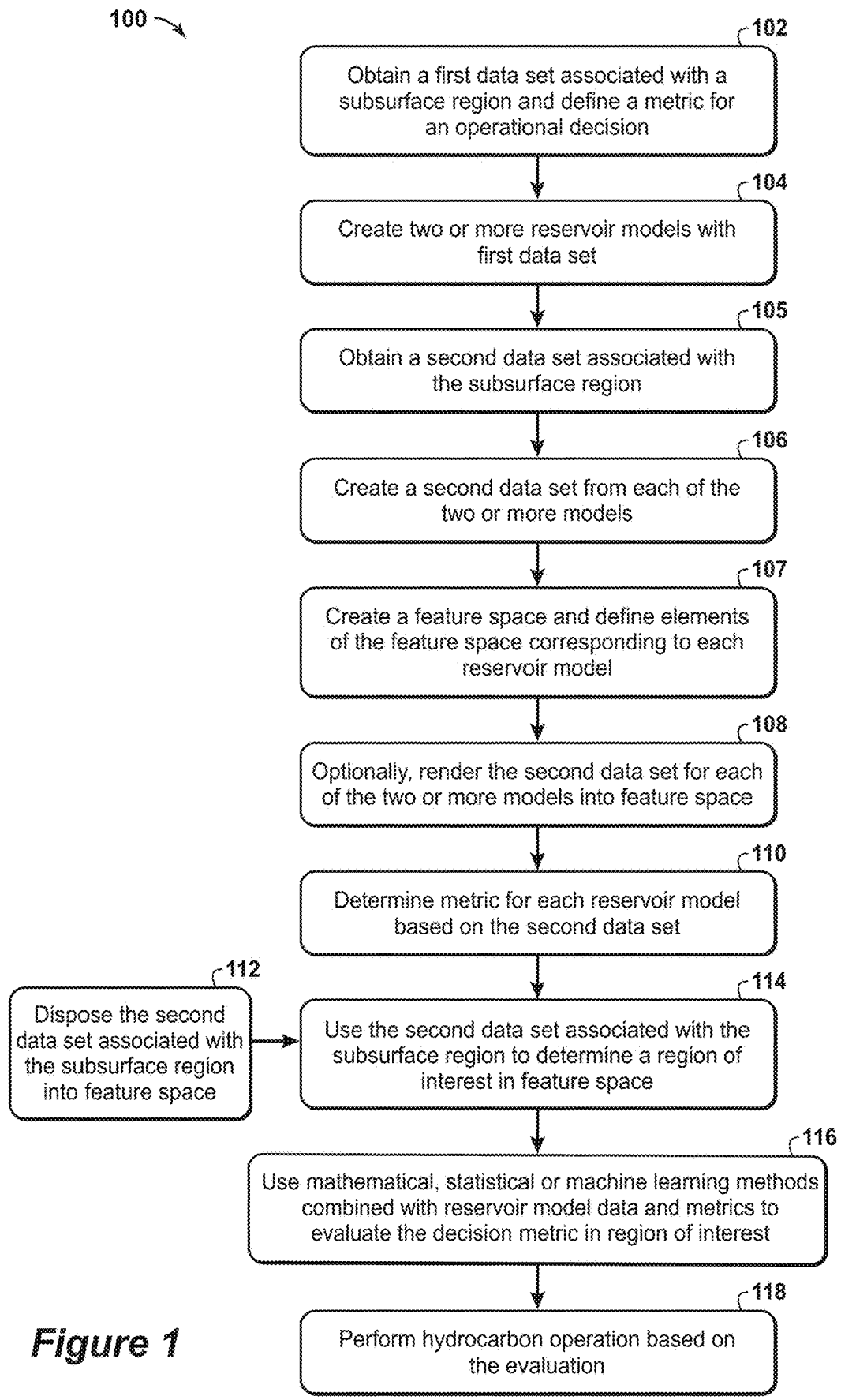
FIG. 1 is an exemplary flow chart in accordance with an embodiment of the present techniques.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a" and "an" are not necessarily limited to mean only one, but rather are inclusive and open ended so as to include, optionally, multiple such elements.

As used herein, the term "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$) and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, shales, sands, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models and determining the likely locations for hydrocarbon reservoirs within the subsurface. The measurement data may include seismic data, gravity data, magnetic data, electromagnetic data and the like.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production; determining and planning equipment to be utilized and techniques to be utilized in extracting the hydrocarbons from the subsurface formation and the like.

As used herein, "hydrocarbon operations" refers to any activity associated with hydrocarbon exploration, hydrocarbon development and/or hydrocarbon production.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example chemicals or hydraulic fracturing the wellbore to promote increased flow, well servicing, well logging, and other well and wellbore treatments.

As used herein, "subsurface model" refers to a reservoir model, a geomechanical model, a watertight model and/or a geologic model. The subsurface model may include subsurface data distributed within the model in two-dimensions (e.g., distributed into a plurality of cells, such as elements or blocks), three-dimensions (e.g., distributed into a plurality of voxels) or three or more dimensions.

As used herein, "geologic model" is a three-dimensional model of the subsurface region having static properties and includes objects, such as faults and/or horizons, and properties, such as facies, lithology, porosity, permeability, or the proportion of sand and shale.

As used herein, "reservoir model" is a three-dimensional model of the subsurface that in addition to static properties, such as porosity and permeability, also has dynamic properties that vary over the timescale of resource extraction, such as fluid composition, pressure, and relative permeability.

As used herein, "simulate" or "simulation" is the process of performing one or more operations using a subsurface model and any associated properties to create simulation results. For example, a simulation may involve computing a prediction related to the resource extraction based on a reservoir model. A reservoir simulation may involve performing by execution of a reservoir-simulator computer program on a processor, which computes composition, pressure, or movement of fluid as function of time and space for a specified scenario of injection and production wells by solving a set of reservoir fluid flow equations.

In hydrocarbon operations, a subsurface model is created in the physical space or domain to represent the subsurface region. The subsurface model is a computerized representation of a subsurface region based on geophysical and geological observations made of regions on and/or below the surface of the Earth. The subsurface model may be a numerical equivalent of a three-dimensional geological map complemented by a description of physical quantities in the domain of interest. The subsurface model may include multiple dimensions. The subsurface model may include a structural framework of objects, such as faults and horizons, and may include a mesh or grid of nodes to divide the structural framework and/or subsurface model into cells, which may include mesh elements or blocks in two-dimensions, mesh elements or voxels in three-dimensions or other suitable mesh elements in other dimensions. A cell, such as block, mesh element or voxel, is a subvolume of the space, which may be constructed from nodes within the mesh.

Subsurface modeling is utilized in hydrocarbon development and hydrocarbon production phases for hydrocarbon assets. Hydrocarbon development involves determining capital and operating decisions, which relate to the plans for production from an asset. During such stages, one or more subsurface models are created, which are conditioned to seismic data, well logs, well test data, and any other available data to determine the underlying geological and statistical concepts for the subsurface region. Accordingly, the subsurface models may be used to determine the fluid flow within the reservoir and from the respective production wells.

Reservoir modeling and simulation are utilized to support particular business decisions. While in the hydrocarbon development phase, the decisions are broad in scope, such as whether to pursue a project, or selections regarding facilities design and constraints, for example. While in the hydrocarbon production phase, the decisions are typically more specific, such as whether to drill a new well or a location for a new well, for example.

The present techniques relate to a system and method that uses regression and classification in subsurface models to support decision making for hydrocarbon operations. The resulting enhancements may then be used for hydrocarbon operations, such as hydrocarbon exploration, hydrocarbon development and/or hydrocarbon production. Accordingly, the present techniques may frame the hydrocarbon operations decisions and analysis as a discrete decision (e.g., yes or no, or a one or zero). The alternative method of optimizing a subsurface model through the incorporation of additionally obtained data is time-consuming and cumbersome, and generates specific information about the model that is not used to support any particular hydrocarbon operations decision. Thus, the present techniques do not involve themselves in the inefficiencies of optimizing a reservoir model to match production data, as this effort in determining a large amount of highly granular model information, is irrelevant to the hydrocarbon operations.

The present techniques involve dividing a data set describing a model and/or the "truth case" (corresponding to actually observed data) into different categories. A first data set, which may be referred to as data set A, includes data that is used to condition two or more reservoir models that form the ensemble of reservoir models. This conditioning may be performed using a variety of techniques known in the art. The first data set may include seismic data, well test data and well log data that is used to generate the reservoir models. A second data set, which may be referred to as data set B, includes data that is not used to condition the reservoir models, but instead defines a feature space (which may ultimately be simplified or reduced in dimension) in which the reservoir model results or operations data can be represented as points. For example, the second data set may include simulation results, production data, generated or observed seismic data, generated or observed well test data and/or generated or observed well log data. Finally, a metric corresponding to some physical parameter of interest that supports the operations decisions is provided. Examples of such a metric may include the expected ultimate recovery from a reservoir (EUR), which is often used to guide hydrocarbon operation decisions, or expected incremental cumulative oil produced from hydrocarbon operation decision (e.g., as drilling or using an in-fill well). This metric can also be included as a position descriptor for the points in the feature space.

The present techniques involve analyzing the results of simulations of an ensemble of reservoir models (e.g., two or more reservoir models) to provide information on particular hydrocarbon operations. The method may include various steps, such as assigning particular data to the data set A or data set B, obtaining or creating two or more reservoir models, using the reservoir models in simulations and analyzing the results in a feature space.

In one example corresponding to hydrocarbon production operations, the reservoir models may be conditioned to an initial data set (e.g., the first data set or data set A), which may include seismic data and appraisal well data, but not necessarily production data. The reservoir models should include plausible geological scenarios consistent with the initial data set. The models can be used to generate data set B, which define the highest dimensional feature space possible. An example may be production data over a particular time period in the range between 0 less than (<) t<T, where production may have started at time t equal to (=) 0, and the time t=T may be a time at which a particular decision (e.g., such as adding an infill well to the field development) may be implemented. Then, two simulations may be performed for each of the reservoir models, which involve one using performing the existing hydrocarbon operations (e.g., using the existing equipment) and the other being the new or updated hydrocarbon operations (e.g., new or updated equipment, well, etc.) subsequent to the time T. From the simulation results, the desirability of the hydrocarbon operation may be determined based on the production differences between the simulations with the respective models, which may be differences in production metrics. A feature space can be defined as a Cartesian space whose axes are the rates at selected times of the phases (oil, gas, water) produced at each well, as well as pressure information corresponding to the wells (e.g. bottom hole pressure). This is an example only; linear or non-linear transformations of these quantities can also be used to define the feature space. Each of the reservoir model results for time in the range between 0<t<T may be embedded into the feature space, which accounts for production information prior to the time of the new or updated hydrocarbon operation. Then, one or more points within the feature space corresponding to the measured or observed production data, possibly with synthetic noise added (e.g., a "truth case" of the measured production data time series over time in the range between 0<t<T) can be added to the feature space, where the one or more points may have a spatial relationship within that space. The spatial relationship may be the forming of a region or area that is associated with the results within a distance threshold in the space of the measured or observed production data (e.g., actually observed production data). In the feature space, machine learning classification or regression techniques (e.g., k-means clustering, support vector models, or Kriging) may then be used to establish the preferred decision for a given set of data. This may involve regressing the value of the metric to the point, points, or region that represent the truth case from neighboring reservoir models (e.g., in the feature space or the higher dimensional space), which have been simulated (e.g., both prior to and subsequent to the time T); and/or may involve estimating a probability distribution function of the metric value for the preferred decision or may involve determining clusters from the data corresponding to the reservoir models. The metric may be defined as a function in the feature space, with regression to the value of the function at the point, points, or region corresponding to the truth case, or it is possible to create a larger feature space by including the metric value as an axis, and then determine the metric at the truth case point or points using conventional regression methods, as noted above, in the sub-region occupied by reservoir model data in that larger space. These two approaches are equivalent.

In another example corresponding to hydrocarbon development operations, data set A may comprise seismic data indicating basic geologic structures, environments of deposition, and other seismically observable or inferable properties, and data set B may comprise well log and well test data from one or more appraisal wells. Two or more reservoir models may be created from data set A, and synthetic results from examination of these models may be used to create data corresponding to synthetic well log or well test results corresponding to the positions of the appraisal wells, these latter comprising data set B. A feature space can be created by choosing a parameterization of these latter well log or well test results, using methods known to those skilled in the art, and using these parameters to define the axes of a Cartesian space. Linear or non-linear transformations of these parameters may also be used to define the axes. The measured well log or well test results from the appraisal well or wells, possibly with synthetic noise added, may then be placed in the feature space in which data set B is indicated; regression or classification techniques may then be used to characterize the expected value of a metric, such as EUR (Expected Ultimate Recovery), which may be computed from the models, at the point, points or region in feature space corresponding to the measured data (e.g., the truth case).

In the present techniques, the reservoir models are not conditioned or changed (subsequent to their initial formulation using data set A), as in conventional history matching operations, but are utilized in evaluating the performance of hydrocarbon operations. Also, the reservoir models are not filtered or reviewed to indicate that any particular reservoir model or models is determined to be the closest, in some quantitatively defined sense, to the subsurface region (e.g., actual subsurface region). This is beneficial because the simulation of even a large number of models to determine the parameters that may be used to create data points in the feature space is more computationally efficient and less cumbersome than the "inverse problem" of trying to determine a reservoir model that matches the truth case data. Once the parameters appropriate for the particular hydrocarbon operation decision to be evaluated have been determined, the prediction of the metric describing the outcome of that operation is determined by the evaluated metric of neighboring reservoir models in the feature space, following statistical methods to average over these behaviors to provide a robust solution in that particular feature space. The regression method depends on the metric used, and thus may vary with the business decision being analyzed, even for the same ensemble of models. Thus, the statistical regression techniques may weigh the different reservoir models differently in determining the metric or metrics describing the outcome of the hydrocarbon operations decision at the point or points or region corresponding to the truth case (e.g., within a zone or region near or within a threshold of the truth case). Accordingly, different reservoir models may contribute differently to different decisions, which is not the result if history matching is performed to identify a preferred, optimal, or best reservoir model.

Moreover, the present techniques utilize the behavior for the models, which may be computed directly from their properties, such as production for times in the range $0<t<T$ or $t>T$ (in the production example) or EUR (in the development example). Because any property relevant to hydrocarbon operations of these models for any time may be determined by the simulation, the present techniques provide a mechanism to verify and to test the robustness of the present techniques. One particular model may be chosen as a "synthetic truth case", and the classification and regression method can be executed on the remaining models within the ensemble. The value computed for the metric at the synthetic truth case may then be compared with the actual value of the metric for the chosen model, which is computable, thereby providing a test of the robustness and accuracy of the procedure for a particular ensemble of models, a particular choice of data sets A and B, and a particular metric used to evaluate an envisioned hydrocarbon operations decision. The data for these model results may also be used to tune the feature determination and regression and/or classification algorithms prior to identification of the predicted behavior for the hydrocarbon operations being evaluated. For example, this may involve using methods, such as, Lasso regression and/or sensitivity analysis, to identify features, which are most informative of the metric of interest.

Feature space creation is commonly practiced in machine learning applications, and may follow standard supervised or unsupervised machine learning practices. Pre-existing domain knowledge about the subsurface region or its analog in another region and existing data may be used to assist in defining the feature space. As an example, if data set B includes a set of time series of production data from existing M wells at N time points within the time interval (0, T), data set B may be considered to be embedded in a feature space of dimension greater than or equal to MN, depending on how many data observations are conducted at each well. Then, the dimension of the feature space may be changed by transforming data vectors in data set B into feature vectors via a feature map. A feature map may be based on polynomial combinations of components in a data vector or alternatively functional data analysis (FDA) can be used to define a set of basis vectors and coefficients that approximate, within some specified accuracy, the full data set. Further, another alternative configuration may include FDA that may be used to describe the features. FDA involves representing the functional data (e.g., time series corresponding to multiphase flow rates at wells, by coefficients of the smoothing spline or low-dimensional representation of the smoothing spline coefficients). A feature space may be infinite dimensional and a feature map need not be explicitly constructed. Regression or classification in the feature space can be performed using function kernels representing inner products in the feature space. In this case, choosing a kernel is equivalent to choosing feature map(s) and/or feature space(s). Radial basis functions are often used as kernels in practice.

There are multiple ways to construct a feature space, including direct use of the original data set B as well as possible linear or non-linear transformations of this data, which may result in an altered (e.g., a lower) dimensionality feature space. In feature space selection, the feature space that provides the most confident and unbiased evaluation of the operations under consideration should be chosen. It follows that the feature space constructed, even for the same ensemble of reservoir or subsurface models, may be different based on the hydrocarbon operations decision to be evaluated. Visual display may be used to assist the selection of the feature space. Dimension reduction methods, such as multi-dimensional scaling or nonlinear dimensionality reduction methods (e.g., manifold learning), such as those described and developed in the machine learning literature, may be used to reduce the dimension of the feature space to two or three-dimensional space for visual inspection. Many such methods are described and known to those skilled in the art. By way of example, such methods may include those discussed in Friedman et al., "The elements of statistical learning", vol. 1, Springer, Berlin: Springer series in statistics, 2001 and Suzuki et al., "Using Association Rule Mining and High-Dimensional Visualization to Explore the Impact of Geological Features on Dynamic Flow Behavior", SPE Annual Technical Conference and Exhibition, Society of Petroleum Engineers, 2015.

In certain configurations, specific knowledge about the subsurface region may be incorporated into feature space selection. For example, an understanding of the large scale reservoir structure and initial reservoir pressure (e.g., part of data set A) may provide a mechanism to determine that a subset of data set B (e.g., gas production over time at certain wells near the in-fill well) may correlate strongly with the operations being evaluated. This subset of data may be used to build the feature space. Alternatively, certain information in data set B may be of greater physical significance than other information (e.g., the time when water breaks through at certain producers), this understanding might be used to reduce the number of data points that are used in defining the feature space. This selection may lessen the dimensionality of the feature space. In another instance, the pressure differences between injector and producer pairs over time or the derivatives of production rates with respect to time may be used to enhance the feature space, which may increase the dimensionality of the feature space. Signal processing tools, which may involve wavelet analysis, may be used to find identifiable or primary characteristics of the time series in the frequency or time domain. These characteristics (e.g., coefficients of wavelet basis functions) can then be used to construct feature space. Similar procedures can be applied to spatial data along wellbores, for instance in the hydrocarbon development operations example previously discussed.

Accordingly, in certain configurations, different approaches to feature space construction may be used. The dimensionality of the feature space may decrease or increase through transformation of data vectors. Also, as another example, a tailored principal component analysis (PCA) or reduction method may be used, which is related to an objective or goal (e.g., parallel to the metric of interest and/or expanding the divergence of the metric of interest). Further, the method may involve performing machine learning, which may be represented in a lower dimensional space to be visualized. In addition, the selection of features that amplify differences may be preferred. Moreover, the method may include using principal component analysis to reduce the feature space, which may be embedded into a higher dimensionality space for certain configurations.

In certain configurations, the underlying geological drivers for performance of any particular decision relating to hydrocarbon operations may be further evaluated. The present techniques may also involve combining the methods above with regression tree analysis of the underlying geological parameters (especially categorical choices in the construction of the ensemble of subsurface models, such as environment of deposition choices). In such a configuration, the regression tree analysis may be used to identify systematic correlations between particular geological unknowns and characteristics either of data set B or of one or more hydrocarbon operations decision outcomes.

To enhance hydrocarbon operations, the present techniques provide enhancements for analyzing results of simulations of reservoir models to evaluate particular hydrocarbon operations. For example, in one configuration, a method for evaluating and performing a hydrocarbon operation for a subsurface region is described. The method comprising: obtaining a first data set associated with a subsurface region, wherein the two or more reservoir models are based on a first data set; creating two or more reservoir models for a subsurface region from the first data set; obtaining a second data set associated with a subsurface region and the two or more reservoir models; obtaining production data associated with a subsurface region; disposing the production data and at least a portion of the second data set into a feature space; determining a region of interest within the feature space; evaluating the results of a hydrocarbon operation at the region of interest in the feature space; and determining whether to perform a hydrocarbon operation based on the evaluation of the region of interest.

The method may include various enhancements. For example, the method may include performing one or more regression techniques to evaluate the region of interest; wherein the first data set comprises one of seismic data, well log data and any combination thereof; wherein the second data set comprises one of generated or observed seismic data, generated or observed well log data, generated or observed well test data and any combination thereof; wherein the second data set comprises one of well log and well test data from appraisal wells; simulating each of the two or more reservoir models with the hydrocarbon operation being performed to create first simulation results, simulating each of the two or more reservoir models with the hydrocarbon operation not being performed to create second simulation results using the first data set; and wherein the second data set comprises the first simulation results and the second simulation results; simulating each of the two or more reservoir models with the hydrocarbon operation being performed to create simulation results; wherein the second data set comprises the first simulation results and the second simulation results; transforming the second data set to alter dimensionality of the at least a portion of the second data set prior to disposing the at least a portion of the second data set into the feature space; and/or wherein the hydrocarbon operation may comprise adding a new well to access the subsurface region.

Beneficially, the present techniques provide various enhancements to the hydrocarbon extraction process. The present techniques avoid the slow and cumbersome process of determining the reservoir or subsurface model that preferrably matches or assimilates additional data (data set B). In addition, the techniques use information from the full ensemble of two or more reservoir models, and not just from one or more history matched models, to evaluate the results of a hydrocarbon operation, which may improve the accuracy of the determination of the results of a hydrocarbon operation under consideration. Furthermore, the techniques allow two or more reservoir or subsurface models comprising the ensemble to be used differentially to support different hydrocarbon operations decisions, which may also improve the accuracy of the determination of the results of these different hydrocarbon operations. The present techniques may be further understood with reference to FIGS. 1 to 4, which are described further below.

FIG. 1 is an exemplary flow chart 100 in accordance with an embodiment of the present techniques. The flow chart 100 includes a method for analyzing the results of simulations of an ensemble of reservoir models to provide information on particular hydrocarbon operations to enhance operations. The method may include obtaining data and reservoir models for the subsurface region, as shown in blocks 102 to 104. Then, second data sets may be created along with an associated metric, as shown in blocks 106 to 110. Finally, the measured data and computed metrics may be placed into the feature space, as shown in blocks 112 to 114. Then, a hydrocarbon operation may be evaluated and performed based on the review, as shown in blocks 116 to 118.

To begin, the method involves obtaining a first data set for a subsurface region, which may include seismic data, well log data, well test data, well appraisal data, or production data, and obtaining two or more reservoir models for the subsurface region conditioned to this data, as shown in blocks 102 to 104. At block 102, a first data set associated with a subsurface region and a metric associated with a operational decision (e.g., potential hydrocarbon operations decision) are obtained. For example, the first data set may include seismic data, well test data and/or well log data, while the metric may be a parameter associated with the results of a hydrocarbon operation. The metric may correspond to a physical parameter of interest in supporting hydrocarbon operations decisions. By way of example, a metric may include the expected ultimate recovery from a reservoir (EUR) and/or expected incremental cumulative oil produced due to a hydrocarbon production decision. At block 104, two or more reservoir models may be created based on the first data set associated with the subsurface region. The determination of the metric may or may not influence the particular reservoir models chosen and/or constructed. The reservoir models may be stored and obtained from memory or may be created to represent the subsurface region. For example, the reservoir models may be created from seismic data, well test data and/or well data, and may be subsequently conditioned to seismic data, well data, well test data and/or production data. The reservoir models may include a mesh that forms various mesh elements. The mesh elements may have one or more properties assigned to each mesh element. The properties may include transmissibility, rock type, porosity, permeability, rock compressibility, oil saturation, clay content and/or cementation factors, for example.

At block 105, a portion of second data set associated with the subsurface region is obtained. The portion of the second data set corresponding to measurements of the actual subsurface region is obtained. Once created the reservoir models may be used to create the remainder of the second data set. At block 106, a second data set is created from each of the two or more reservoir models. As examples, the second data set may include simulation results, generated or observed seismic data (e.g., generated from the model of the subsurface region combined with seismic forward modeling methods known in the art) and/or generated or observed well log data (e.g., generated from the model of the subsurface region combined with modeling methods known in the art). At block 107, a feature space and defined elements of the feature space corresponding to each reservoir model is created. The construction of the feature space may be included in which the second data set, or a portion thereof is included in the feature space, in block 107. The inclusion may involve construction of the feature space and specifying the elements in the feature space corresponding to each reservoir model. Then, the second data set for each reservoir model may be included into feature space, as shown in block 108. At block 110, a metric is determined for each reservoir model based on the second data set. The metric may be computed from the reservoir model. As an example, the difference between cumulative oil production corresponding to taking or not taking a particular hydrocarbon operations decision (e.g., introducing an infill well to the field development) is a metric that can be computed using reservoir simulation methods known in the art. Further, the metric may correspond to a physical parameter of interest in supporting a hydrocarbon operations decision. Examples of such a metric may include the expected ultimate recovery from a reservoir (EUR), which is often used to guide hydrocarbon development decisions, or expected incremental cumulative oil produced from hydrocarbon production decisions (e.g., an in-fill well). The hydrocarbon operation may include one or more hydrocarbon exploration operations, one or more hydrocarbon development operations and/or one or more hydrocarbon production operations. For example, the hydrocarbon production operation may involve installing or modifying a well or completion, modifying or adjusting drilling operations, decreasing fracture penetration, and/or to installing or modifying a production facility.

Once obtained, the measured data and computed metrics may be placed into the feature space, as shown in blocks 112 to 118. At block 112, the second data set associated with the subsurface region is disposed into feature space. The measured data may include production data or other measured data from the subsurface region. At block 114, the second data set associated with the subsurface region may be used to determine a region of interest in feature space. The measured data, and may be the metric, are used to identify a region of interest. The identification of a region of interest may involve determining a threshold or area surrounding a specific measured data point or points.

At block 116, the metric in the region of interest may be evaluated. The evaluation of the metric in the region of interest, which corresponds to a hydrocarbon operation, may involve performing regression techniques. These regression techniques may be one of the regression techniques noted above, for example. Finally, the hydrocarbon operation may be performed or not based on the evaluation, as shown in block 118. The hydrocarbon operations may include hydrocarbon exploration operations, hydrocarbon development operations and/or hydrocarbon production operations. For example, the hydrocarbon operation may include installing or modifying a well or completion, modifying or adjusting drilling operations, decreasing or increasing fracture penetration, and/or to installing or modifying a production facility. The production facility may include one or more units to process and manage the flow of production fluids, such as hydrocarbons and/or water, from the formation.

Beneficially, this method provides an enhancement in the production, development and/or exploration of hydrocarbons. In particular, the method may be utilized to enhance the decision for a hydrocarbon operation based on the metric being reviewed. Further, this method does not rely upon trying to lessen uncertainty in the reservoir models.

Figure 2:
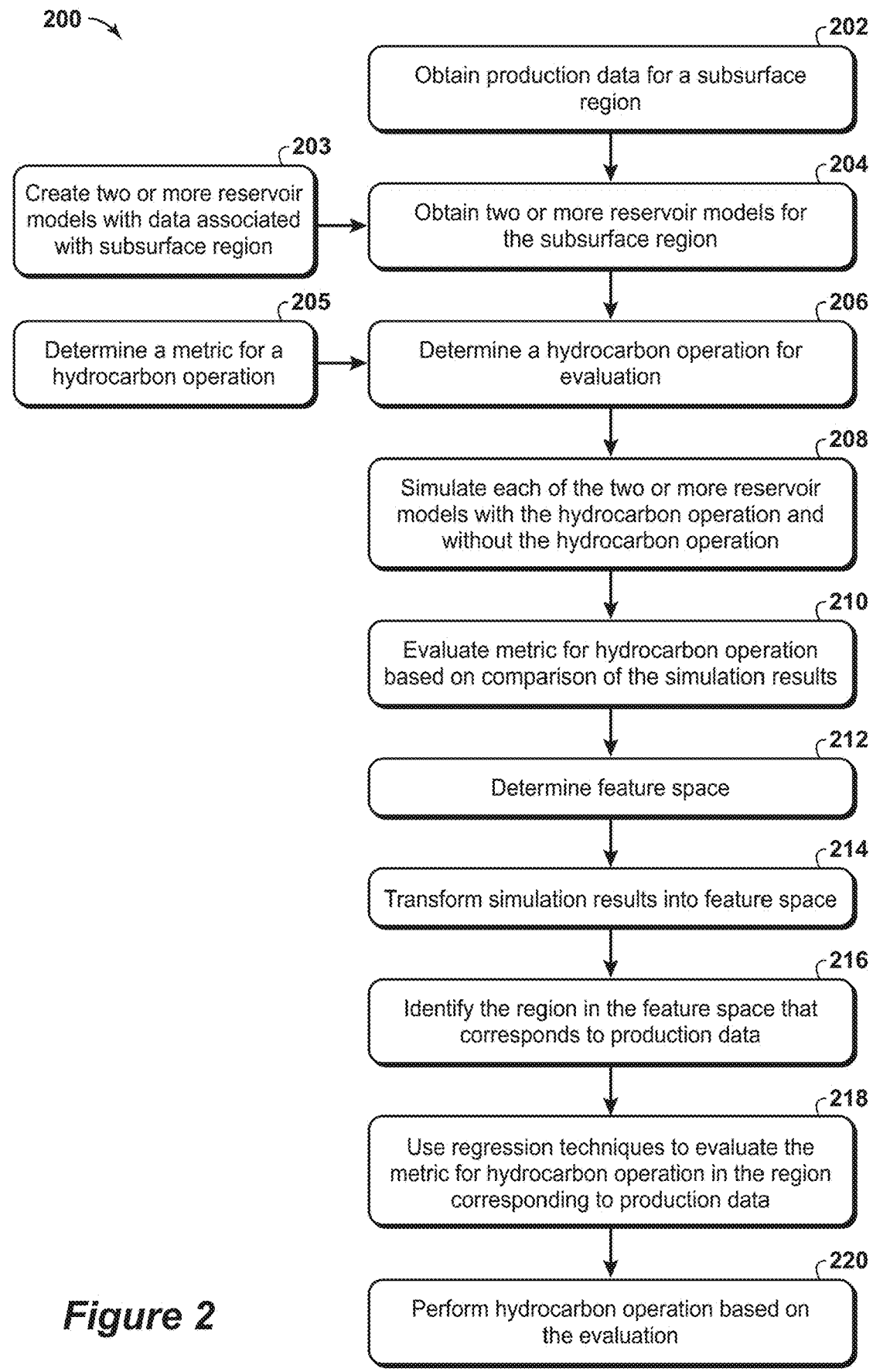
FIG. 2 is another exemplary flow chart in accordance with an embodiment of the present techniques.

FIG. 2 is an exemplary flow chart 200 in accordance with an embodiment of the present techniques. The flow chart 200 includes a method for analyzing the results of simulations of an ensemble of reservoir models to provide information on particular hydrocarbon operations to enhance operations. The method may include obtaining data and reservoir models for the subsurface region, as shown in blocks 202 to 204. Then, a hydrocarbon operation may be evaluated through simulations of the reservoir models, as shown in blocks 205 to 210, and then a feature space is used with regression techniques to evaluate the hydrocarbon operation, as shown in blocks 212 to 218. Finally, the hydrocarbon operation may be performed, as shown in block 220.

To begin, the method involves obtaining data for a subsurface region, and obtaining two or more reservoir models for the subsurface region, as shown in blocks 202 to 204. At block 202, production data is obtained for the subsurface region of interest. The production data may include measured data from wells or other measured data. At block 203, two or more reservoir models may be created from other data associated with the subsurface region. The other data used to create the reservoir models may include seismic data, well test data and/or well data (e.g., a first data set). Then, two or more reservoir models associated with the subsurface region are obtained, as shown in block 204. The reservoir models may be obtained from memory, may have been used previously for other hydrocarbon operations decisions, or may be created to represent the subsurface region. For example, the reservoir models may be created from seismic data, well test data and/or well data, and may be subsequently conditioned to seismic data, well test data, well data and/or production data. The reservoir models may include a mesh that forms various mesh elements. The mesh elements may have one or more properties assigned to each mesh element. The properties may include transmissibility, rock type, porosity, permeability, rock compressibility, oil saturation, clay content and/or cementation factors, for example.

Then, the present techniques may evaluate a hydrocarbon operation through simulations of the reservoir models, as shown in blocks 205 to 210. At block 205, a metric for a hydrocarbon operation is determined. The metric may corresponding to a physical parameter of interest in supporting hydrocarbon operation decisions. By way of example, a metric may include the expected ultimate recovery from a reservoir (EUR) and/or expected incremental cumulative oil produced corresponding to a particular hydrocarbon operation. At block 206, a hydrocarbon operation is determined for evaluation.

The hydrocarbon operation may include one or more hydrocarbon exploration operations, one or more hydrocarbon development operations and/or one or more hydrocarbon production operations. For example, the hydrocarbon production operation may involve installing or modifying a well or completion, modifying or adjusting drilling operations, decreasing or increasing fracture penetration, and/or to installing or modifying a production facility. Once the hydrocarbon operation is determined, each of the two or more reservoir models are simulated with the hydrocarbon operation and without the hydrocarbon operation, as shown in block 208. The hydrocarbon operation may include large scale decisions, such as whether or not to develop a field at all, in which latter case the simulation without the hydrocarbon operation may essentially consist of not developing the field at all. The performance of the simulation may include modeling fluid flow based on the reservoir model and the associated properties stored within the mesh elements (e.g., cells or voxels) of the respective reservoir model. The simulation results may include the computation of time-varying fluid pressure and fluid compositions (e.g., oil, water, and gas saturation) and the prediction of fluid volumes produced or injected at wells. The simulation results and/or the respective reservoir model may be outputted. The outputting of the simulation results and/or the subsurface model may include displaying the simulation results and/or the reservoir model on a monitor and/or storing the simulation results and/or the reservoir model in memory of a computer system. The simulations are performed once with the hydrocarbon operation being performed and once without the hydrocarbon operation being performed for each of the respective reservoir models. Once the simulations are performed, a metric for the hydrocarbon operation is determined based on a comparison of the simulation results, as shown in block 210.

Once the simulations are performed, a feature space is used with regression techniques to evaluate the hydrocarbon operation, as shown in blocks 212 to 218. The regression techniques may include estimate of the model form error or bias along with estimate of measurement noise. At block 212, a feature space is determined. As noted above, the feature space may be a higher dimensional space or may be a lower dimensional space with respect to some reference, e.g. that created by raw, unfit or unapproximated data alone. The feature space may be used to highlight differences and to assist in evaluating the metric and/or hydrocarbon operations. Then, the simulation results or a portion of the simulation results are optionally transformed into the feature space, as shown in block 214. This transformation may involve a mathematical representation or a graphical representation, which may depend on the size of the dimensionality. Then, at block 216, a region of interest in the feature space is identified. The region of interest may be identified by setting a threshold that defines the region as compared with a truth point or actual production data. The region of interest may be extended or altered to account for noise. At block 218, regression techniques are used to evaluate the outcome of the hydrocarbon operation at the point, points or region corresponding to the region of interest. The regression techniques may be similar to those noted above.

Finally, the hydrocarbon operation may be performed based on the evaluation, as shown in block 220. The hydrocarbon operations may include hydrocarbon exploration operations, hydrocarbon development operations and/or hydrocarbon production operations. For example, the hydrocarbon operation may include installing or modifying a well or completion, modifying or adjusting drilling operations, decreasing fracture penetration, and/or to installing or modifying a production facility. The production facility may include one or more units to process and manage the flow of production fluids, such as hydrocarbons and/or water, from the formation.

Beneficially, this method provides an enhancement in the production, development and/or exploration of hydrocarbons. In particular, the method may be utilized to enhance the evaluation of the hydrocarbon operation by providing a region of interest that does not involve refining the reservoir models, but is directed to evaluating the hydrocarbon operations.

By way of example, the present techniques may be utilized for evaluating drilling a new well. In the present techniques, the reservoir models and production data are obtained, as shown in blocks 202 and 204 of FIG. 2, and used in the analysis for a determined hydrocarbon operation, such as drilling a new well, as shown in block 206. In particular, the production data may be accumulated from an initial time $T_0$ until time T (or Tarn) that involves a decision to place a new well or to not place a new well. The workflow to support the drill a new well decision may include various steps. The reservoir models may be a suite of reservoir models used during the development phase as part of a scenario generation or scenario discovery process. It may be useful that the reservoir models span all plausible geological scenarios consistent with the development-phase data.

Then, as shown in block 208, two simulations of each reservoir model may be performed. In a first simulation, a first reservoir model is simulated with existing wells and facilities through a target time $T_{max}$, but without the new well being reviewed. In a second simulation, the first reservoir model is simulated through target time $T_{max}$ with the new well inserted at decision time $T_{drill}$. Similar simulations are also performed for the second reservoir model, and any other reservoir models being utilized in the evaluation.

As shown in block 210, the desirability of the decision to drill the new well is based on the production differences or comparisons between simulations with the new well and simulations without the new well for the respective models. The production differences may be a production metric, such as differences in oil produced for a time in the range between $T_{drill} < t < T_{max}$ (where t is time for the respective time step), an absolute production metric, or water breakthrough time or other facilities-related metric. Based on the production metric, each reservoir model is tagged with a parameter related to the difference observed between simulations with the new well and simulations without the new well.

Then, the feature space is determined and the simulation results are transformed into the feature space, based on the simulated production data for a time in the range between $0 < t < T_{drill}$, as shown in blocks 212 and 214. The feature space accounts for production data prior to the time of the insertion (or non-insertion) of the well at change time $T_{drill}$. This feature space is one whose axes are a summary of all of the information in the various time series of production information; numerous technologies such as multidimensional scaling or principal component analysis exist to project the information embedded in the time series into a tractable and relatively low dimensional feature space.

Once the data is in the feature space, machine learning classification and regression techniques are utilized to determine the optimal solution, as shown in blocks 216 and 218. The identification of the point, points, or region in the feature space corresponds to the "truth case" of the actual production data time series over the range $0 < t < T_{drill}$. Then, standard machine learning classification or regression techniques (e.g. k-means clustering, support vector models, kriging) are used to establish the optimal decision given the truth case data. This may be determined by regression of the value of the metric at the truth case point from neighboring simulation results from the respective reservoir models which have been simulated. Alternatively, an estimate of a probability distribution function of the metric value for the truth case may also be utilized. One approach may be to use classification algorithms known in the statistical learning or machine learning art to determine if the point, points, or region corresponding to the truth case clusters or classifies with those reservoir models for which with the decision to add the well was successful or unsuccessful based on pre-determined economic and/or physical criteria.

The method does not change or condition any reservoir model, nor does it identify any particular reservoir model as corresponding to the truth case. The prediction of behavior at the truth case point is determined by the behaviors of neighboring reservoir models, following a statistical method to average over the behaviors to find a robust regression in that particular feature space. Further, the behavior for the time period in the range of $0<t<T_{drill}$ of the production data for any reservoir model may be used as a synthetic truth case, which provides a mechanism to test the robustness of the workflow, and tune both the feature determination and regression and/or classification algorithms prior to identification of the predicted behavior for the actual truth case. The approach is summarized in FIG. 3 below.

Figure 3A:
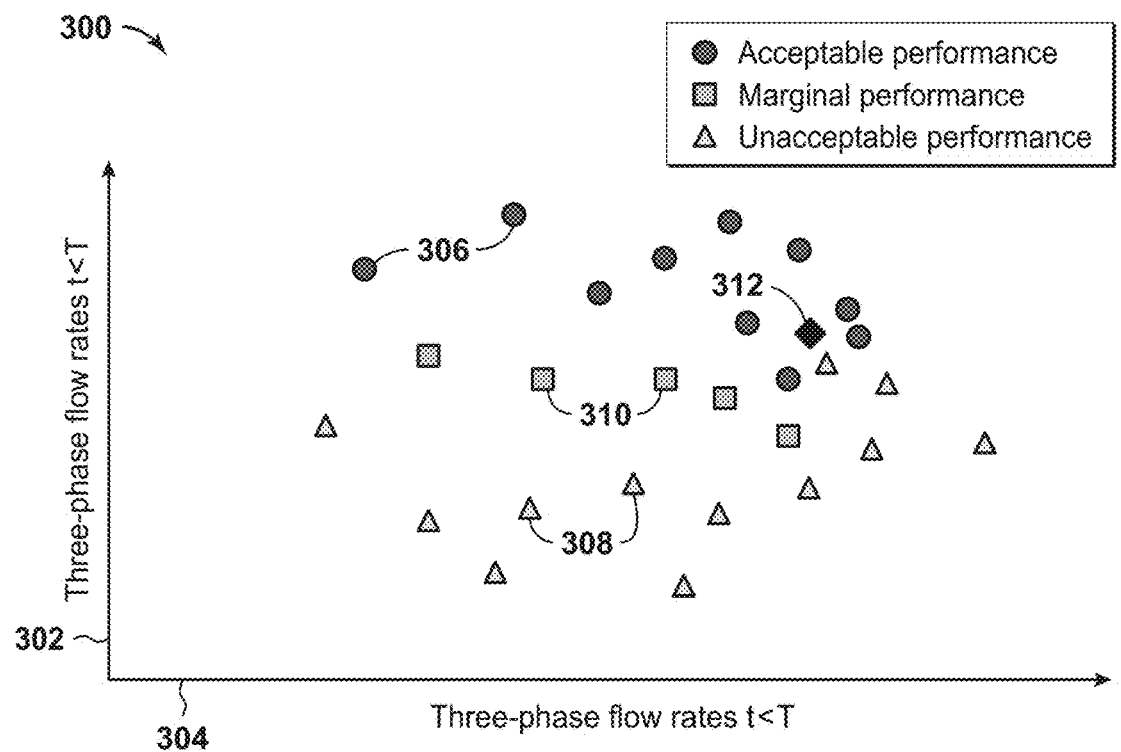

FIG. 3A is an exemplary diagram 300 of a feature space determined by production data. In the diagram 300, the data points, such as data points 306, 308, 310 and 312, are represented along a first axis 302 of three phase flow rate and a second axis 304 of three phase flow rate. Each reservoir model, as well as the truth case, corresponds to a point in the feature space determined by production data for time $t<T_{drill}$. For example, the circle points, such as points 306, represent simulation results that provide acceptable performance with respect to some decision metric corresponding to a hydrocarbon operation, the triangle points, such as points 308, represent simulation results that provide unacceptable performance with respect to the same decision metric, the square points, such as points 310, represent simulation results that provide marginal performance and the diamond point 312 represents the actual flow rates. In this example, the reservoir models are characterized by the performance of the well added at a decision time $T_{drill}$, evaluated for times in the range between $T_{drill}<t<T_{max}$. The analysis estimates that the truth case exhibits acceptable performance, notwithstanding the fact that the apparently closest reservoir model in the feature space exhibits unacceptable performance.

In one example, the method and system may involve a modeling a hydrocarbon operation. A first data set may include pre-production data, which is used to create the ensemble of reservoir models. Then, a second data set may include production history data for time less than the performance of the hydrocarbon operation. Then, the metric may be the total production for the time period after the hydrocarbon operation being performed compared to that without the hydrocarbon operation having been performed.

In another example, the first data set may include seismic data, while the second data set may include appraisal well logs, which may be associated with various wells. Then, the metric may be the expected ultimate recovery from a reservoir (EUR). Implicitly, the hydrocarbon operation in this case is the decision to develop the field, possibly in more than one manner, or with more than one set of facility choices; versus the decision not to develop the field.

Figure 3B:
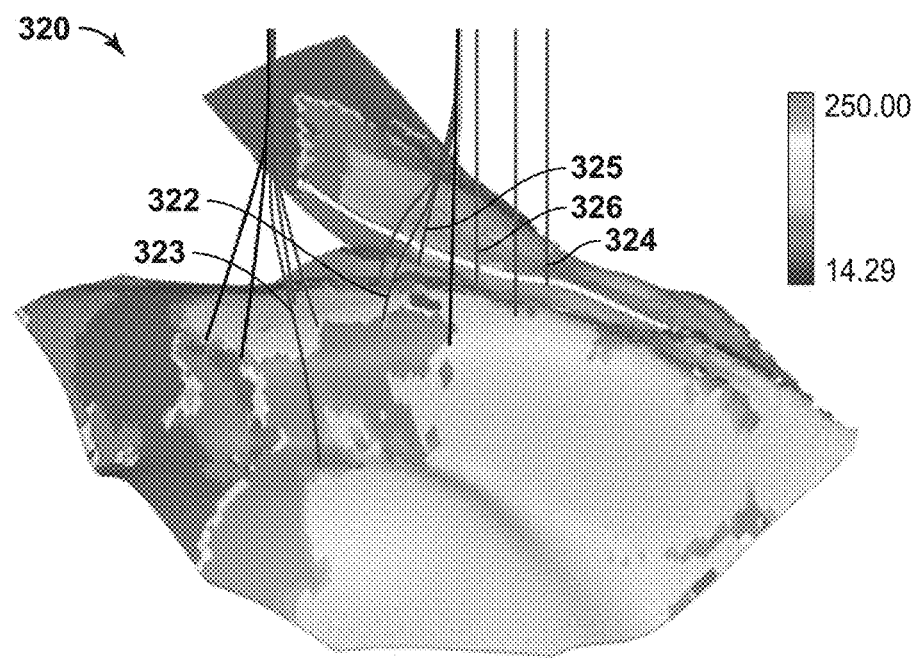
Figures 3C, 3D, 3E, 3I:
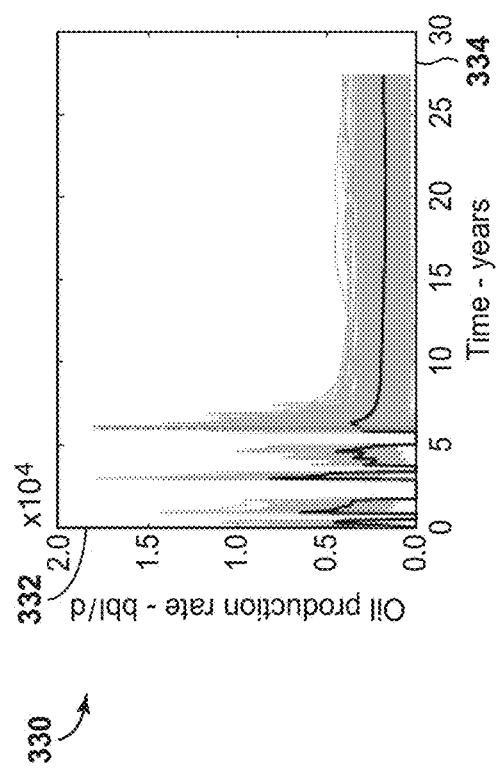

By way of example, FIG. 3B is an exemplary diagram 320, that shows the permeability $K_x$ of a sample realization of the subsurface region, which contains various wellbores that are configured to operate as producers or injectors. This sample realization is a part of an ensemble of 285 reservoir models, which are generated by conditioning the reservoir models to pre-production data. The ensemble of realizations represents uncertainty in the earth parameters, such as the porosity, the proximal/distal/medial grain size, the net-to-gross ratio (NTG) and the stacking pattern. FIG. 3E is an exemplary diagram 346 of the ensemble of the 285 models, which represent different clusters associated with different scenarios. These clusters are shown along a quality of interest (QoI) axis and a history axis ($d_H$).

The subsurface region is assumed to contain ten producer wells and three injector wells. In this example, the metric for hydrocarbon operation, which is denoted by $\not{Z}$, corresponds to an infill drilling decision (e.g., a categorical variable (e.g., 0 or 1)). Further, it is assumed that this infill well (e.g., if drilled) may be brought online (e.g., start producing hydrocarbons) at a time six years from the beginning of the time steps. All the wells are assumed to be bottom hole pressure-controlled. FIG. 3B shows the location of the six (e.g., out of thirteen) wells 322, 323, 324, 325 and the infill well 326 in the hydrocarbon system. FIG. 3C is an exemplary diagram 330, which shows the oil production rate for well 325 in FIG. 3B in the units of barrels per day (bbl/d). In FIG. 3C, the oil production rate during the history corresponds to the time period from the beginning of the hydrocarbon production to six years, which is shown as the history from zero years to six years (noted by the vertical dashed line), which is also plotted separately in exemplary diagram 340 of FIG. 3D. In FIG. 3D, the oil production forecast corresponds to the time period from six years to twenty seven years, which is shown as the oil production rate from six years to twenty-seven years. Further, in FIG. 3C, the oil production rate from different realizations in the ensemble are indicated by curves and the oil production rate for the specific realization shown in FIG. 3B is highlighted by the darker curve. The unit of the oil production rate in axis 332 and 342 is bbl/d, while the unit of time in axis 334 and 344 is years. To predict the metric $\not{Z}$, a comparison of the existing history-matching-based approach with the approach in the present disclosure may be performed.

In a traditional history matching approach, given prior assumption about the earth parameters, denoted by m, and vector of observables, such as the rates (q) and the bottom-hole pressure (BHP) during the history, denoted by $d_H^{obs.}$, the posterior distribution of the earth parameters $p(m|d_H^{obs.})$ may be computed as shown in equation (e1) below:

$$d_{Full} = g(m) \tag{e1}$$

$$d_{Full} = \left[ \underbrace{d_{t_1}, d_{t_2}, \ldots, d_{t_{HM}}}_{History\ d_H}, \underbrace{d_{t_{HM+1}}, \ldots, d_{t_{Nt}}}_{Forecast\ d_F} \right]^T$$

$$p(m \mid d_H^{Obs.}) \propto p(d_H^{Obs.} \mid m) p(m)$$

Here, $d_{t_j}$ denotes the data vector of the observables, such as the rates (q) and the bottom-hole pressure (BHP) at time $t_j$, $d_H$ denotes the observables during the history, $d_F$ denotes the observables during the forecasting period, and g(m) denotes the forward simulator. Next, given samples from the posterior distribution $p(m|d_H^{obs.})$, denoted by $m^{posterior}$, the vector of observables may be predicted (including the flow rates) and the associated uncertainty during the forecast time window. The forecasted rates (and the associated uncertainty) may then be used to compute the metric $\not{Z}$ as shown in equation (e2) below:

$$\not{Z} = P(d_F) \tag{e2}$$

Here, P denotes a mathematical operator which acts on the vector of observables during the forecast time window.

However, history matching is an ill-posed problem and is computationally intensive. Further, to make business decisions, it is the flow predictions and the corresponding uncertainty rather than the posterior geological models ($m^{posterior}$), that are of primary interest. Therefore, in contrast to the history matching approach, here, the present techniques may be used to directly map the latent features (e.g., defined as the data-space of observables in the history and denoted by $d_H$) to the metric ($\mathcal{Z}$). Such a mapping, denoted by J, is shown by equation (e3) below:

$$\mathcal{Z}(x)=P(d_F(x))=P(F(x,d_H))=J(x,d_H)+\in \quad (e3)$$

The mapping J is based on the fact that geological models with similar well connectivity have similar time series, and hence, similar metric ($\mathcal{Z}$).

To construct the mapping, J, a four step procedure may be used. In the first step, the reservoir simulation is performed for all 285 realizations in the ensemble. While performing the reservoir simulation, it is assumed that the infill well was drilled and comes online at six years. Second, the entire reservoir simulation is performed again for all 285 realizations in the ensemble. However, this time, it is assumed that infill drilling was not performed. As a result, for each realization in the ensemble, incremental hydrocarbon production may be computed (e.g., due to infill drilling) and the associated economic impact. Based on the economic impact, for each realization in the ensemble, the metric of interest $\mathcal{Z}$ is computed (e.g., whether it is economically viable to drill infill well ($\mathcal{Z}=1$) or not ($\mathcal{Z}=0$)). The reservoir simulations may be performed by one or more reservoir simulator, as is known in the art. Based on the above two steps, a dataset may be constructed by described by a tuple $\{d_H, \mathcal{Z}\}_i$, where i denotes the realization number. In this example, i=1, 2, . . . , 285. References to the concept of data-space $d_H$ include C. See, e.g., Scheidt et al., "Prediction-focused subsurface modeling: Investigating the need for accuracy in flow-based inverse modeling"", Mathematical Geosciences, 2015, and W. Sun et al., "A new data-space inversion procedure for efficient uncertainty quantification in subsurface flow problems", Mathematical Geosciences, (2017). In the third step, dimensionality reduction is performed on the latent feature space (or the data-space of observables in the history), denoted by $d_H$. In this example, the dimensionality reduction is performed using Functional Data Analysis (FDA). For more details on FDA, refer to the following reference: Ramsay, J. O. (2006), "Functional data analysis. John Wiley & Sons, Inc.". Performing dimensionality reduction using FDA involves the following steps:

1. For each realization, describe the latent features (e,g, the observables during the history, which are denoted by $d_H$). $d_H$ is shown in equation (e1) above.
2. Represent the latent features $d_H$ for $i^{th}$ realization as shown in equation (e4) below:

$$d_{H_i}=x(t_i)+\in_i^{FDA}$$

$$\text{where } x=\Sigma_{k=1}^K \Phi_k(t)c_k \quad (e4)$$

Here, $\epsilon_i^{FDA}$ is noise and $\Phi_k$ represents the basis, such as cubic B-spline basis.
3. Find the coefficients $c_k$ by minimizing equation (e5):

$$\sum_i (d_{H_i}-x(t_i))^2+\lambda J[x] \quad (e5)$$

4. For each well, project the coefficients $c_k$ to a low-dimensional space using principal component analysis (PCA) and denote the low-dimensional representation of the coefficients by $(y_H^{o,w,g})$. Here, "o" denotes the oil phase, "w" denotes the water phase, and "g" denotes the gas phase.
5. Low-dimensional representation of the latent features is now shown in equation (e6).

$$y_H=[(y_H^o)_{P_1},(y_H^w)_{P_1},(y_H^g)_{P_1},\ldots,(y_H^g)_{P_{10}}, (y_H^w)_{I_1},\ldots,(y_H^w)_{I_3}]\in \mathbb{R}^{10\text{-}50} \quad (e6)$$

where $P_j$ denotes $j^{th}$ producer and $I_j$ denotes $j^{th}$ injector. Thus, a dataset that contains tuples $\{y_H, \mathcal{Z}\}_i$, i=1, 2, . . . , 285 is the result.

The results from functional PCA technique are shown in exemplary diagram 350 in FIG. 3F, diagram 352 in FIG. 3G and diagram 354 in FIG. 3H, where the x-axis show the time in years, while the y-axis show the oil production rate during the history (with shutin removed) in bbl/d. FIG. 3G shows the oil production rate for well 325 of FIG. 3B. FIG. 3G shows the reconstructed oil production rate for well 325 in FIG. 3B after representenating $d_H$ (for each realization in the ensemble) using the approximation shown in equation (e5). Similarly, FIG. 3H shows the reconstructed oil rate (for well 325 in FIG. 3B) after representing $d_H$ (for each realization in the ensemble) using functional PCA approximations shown in equation (e6).

In the fourth step, the above dataset is used to learn the mapping J. The technique may be used in this example to learn the form of the mapping J is random forest. See, e.g., Breiman, L. (2001), "Random forests", Machine learning, 45(1), 5-32. This reference provides more details on random forest. Random forest is a (e.g., non-parameteric) decision-tree-based supervised learning technique. It involves segmenting the feature-space into multiple homogenous regions. The segmentation is determined by minimizing the following equation (e7) in a top-down greedy approach:

$$\sum_{n,k: y_H^k \in R_1(j,s)} (\mathcal{Z}^n - \hat{\mathcal{Z}}_{R_1})^2 + \sum_{n,k: y_H^k \in R_2(j,s)} (\mathcal{Z}^n - \hat{\mathcal{Z}}_{R_2})^2 \quad (e7)$$

In equation (e7), $\hat{\mathcal{Z}}^n$ denote average value of metric $\mathcal{Z}$ in a given region, such as R1 or R2 or R3. The recursive segmentation provides a mechanism to capture the nonlinear interactions between the features. The segmentation concept is shown in FIG. 3I that includes the exemplary diagram 360. FIG. 3I shows different realizations (of the ensemble) in two-dimensional representation of $y_H$. In FIG. 3I, the realizations represent drill or do not drill decisions. The darker points denote the realizations for which the metric $\mathcal{Z}$ suggests to drill the infill well, while the lighter points denote the realizations for which the metric $\mathcal{Z}$ suggests not to drill the infill well. In FIG. 3I, the domain (of $y_H$) is divided into regions R1, R2 and R3 as indicated by the lines dividing the points.

Finally, to construct the random-forest-based binary classifier (J) for the metric $\mathcal{Z}$ (e.g., drill or do not drill) as a function of low-dimensional features $y_H$, it is possible to use the dataset for the previously constructed (e.g., tuple $\{y_H, \mathcal{Z}\}_i$). However, to validate the quality of predictions from the random-forest-based binary classifier (J), the original dataset is split into two (unequal) parts. The first part is referred to as the training set, while the second part is referred to as the test set.

The training set (shown in equation e8 below) contains 255 randomly selected realizations from the ensemble. The training set is used to construct the random-forest-based binary classifier J.

$$\Gamma_{tr.} = \{y_{H_1}, \mathcal{Z}_1, y_{H_2}, \mathcal{Z}_2, \ldots, y_{H_n}, \mathcal{Z}_n\}, n=255 \quad (e8)$$

FIG. 3J is an exemplary diagram 370, which shows the oil production rate for well 325 of FIG. 3B for all the realizations in the training set. In this exemplary diagram, the oil production rate (on the y-axis) is shown in bbl/d and the time (on x-axis) is shown in years. FIG. 3K is an exemplary diagram 372, which shows a histogram of the metric $\mathcal{Z}$ for all the realizations in the training set. In FIG. 3K, the y-axis denotes the frequency of the metric $\mathcal{Z}$ (0 on the x-axis denotes the decision to not drill the infill well, and 1 denotes the decision to drill the infill well).

The second part is called the test set (shown in equation e9 below.

$$\Gamma_{test} = \{y_{H_1}^{Obs.*}, \mathcal{Z}_1^*, y_{H_2}^{Obs.*}, \mathcal{Z}_2^*, \ldots, y_{H_m}^{Obs.*}, \mathcal{Z}_m^*\}, m=30$$

$$\mathcal{Z}_{Pred}^* = J(y_{H_1}^{Obs.*}). \quad (e9)$$

This second part contains the remaining 30 realizations from the ensemble. FIG. 3L is an exemplary diagram 374, shows the oil production rate for well 325 of FIG. 3B for all the realizations in the test set. In this exemplary diagram, the oil production rate (on the y-axis) is shown in bbl/d, and time (on the x-axis) is shown in years. FIG. 3M is an exemplary diagram 376, which shows the histogram of the metric $\mathcal{Z}$ for all the realizations in the test set. In FIG. 3K, the y-axis denotes the frequency of the metric $\mathcal{Z}$ (e.g., 0 on the x-axis denotes the decision to not drill the infill well, and 1 denotes the decision to drill the infill well).

The binary classifier J, by construction, has no information about the feature-space $y_H$ or the metric $\mathcal{Z}$ for the realizations in the test set. Thus, the test set acts as a blind test to validate the prediction quality of the random-forest-based binary classifier J. The value of the metric $\mathcal{Z}$, predicted by J on the test set, is denoted by $\mathcal{Z}^*_{Pred}$. Thus, for all realizations in the test set, the prediction quality of J is measured by comparing $\mathcal{Z}^*_{Pred}$ with the actual metric $\mathcal{Z}$ as shown by the confusion matrix in Table 1 below:

TABLE 1

|  | Reference | |
|---|---|---|
| Prediction | Do not drill | Drill |
| Do not drill | 11 | 2 |
| Drill | 0 | 17 |

Finally, in the above (detailed) example, random forest is used as a technique to construct the binary classifier J. In other hydrocarbon applications, the metric $\mathcal{Z}$ can be a categorical variable (with multiple classes) or a real-valued variable such as EUR or NPV. In such cases, different machine learning algorithms for classification (such as the neural networks, support vector machines) or regression techniques (such as neural networks or Gaussian Process) can be used.

Alternatively, a Bayesian calibration approach in the data-space $d_H$ or a low-dimensional representation of the data-space $y_H$ can be used. Such a Bayesian calibration approach may involve expressing the binary/multiclass classifier or regression function (in case the metric $\mathcal{Z}$ is a real-valued variable) as shown in equation (e10) below:

$$\mathcal{Z}(x) = P(d_F(x)) = P(F(x, d_H)) = J(x, d_H) + \delta(d_H) + \epsilon \quad (e10)$$

Here, J is the mapping from the data-space to the QoI-space, x denotes calibration inputs to the mapping J, $\delta$ is the bias/model-form error, and $\epsilon$ denotes the residual uncertainty. The form of the mapping J and $\delta$ can be defined using machine-learning-based algorithms. Let $\theta$ denote the array of hyper-parameters corresponding to J and $\delta$. Then, given the historical production rates $d_H^{obs.}$, the posterior distribution of $\theta$ can be found as shown in equation (e11) below.

$$p(\theta | d_H^{Obs.}) \propto p(d_H^{Obs.} | \theta) p(\theta). \quad (e11)$$

Using $p(\theta | d_H^{obs.})$ the posterior mean $\mu_Z$ and variance $\sigma_Z$ can be computed.

Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

Figure 4:
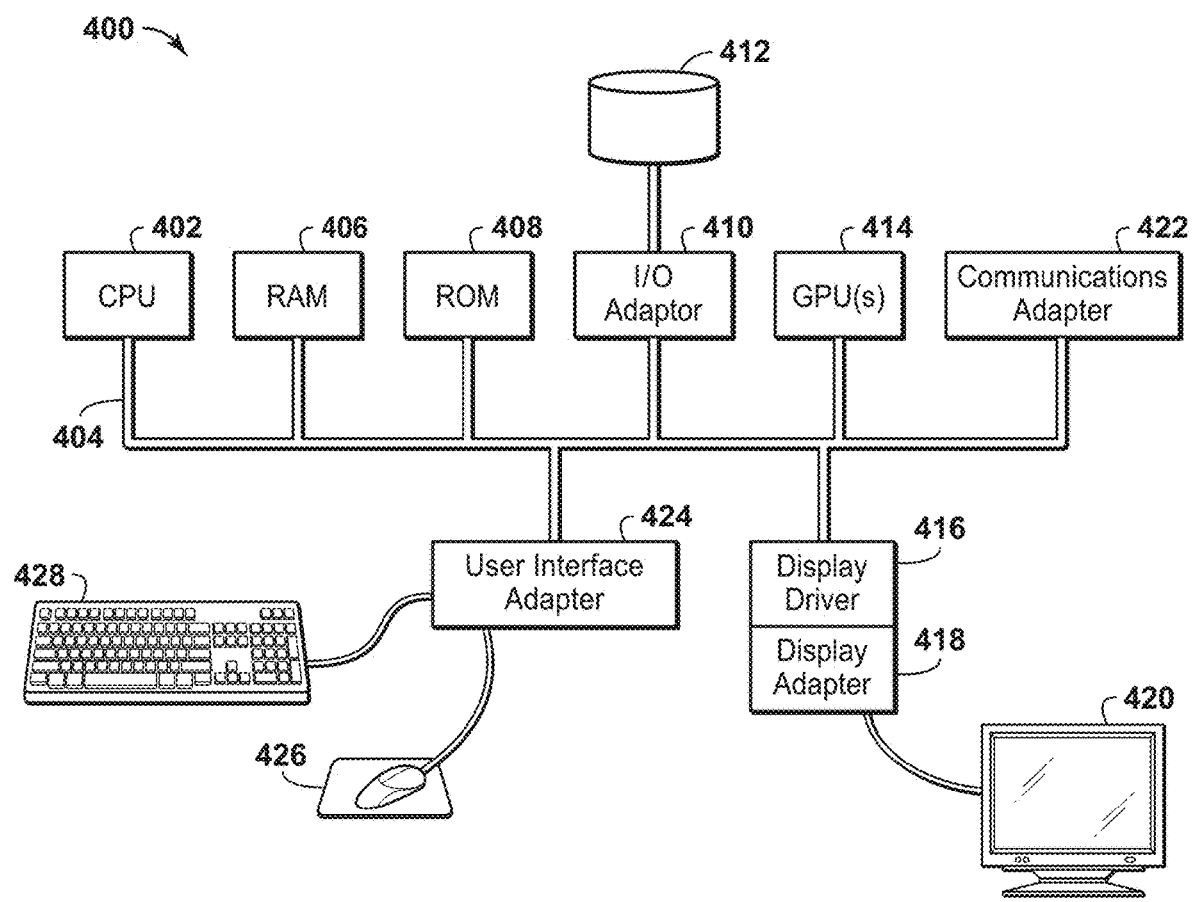
FIG. 4 is a block diagram of a computer system that may be used to perform any of the methods disclosed herein.

As an example, FIG. 4 is a block diagram of a computer system 400 that may be used to perform any of the methods disclosed herein. A central processing unit (CPU) 402 is coupled to system bus 404. The CPU 402 may be any general-purpose CPU, although other types of architectures of CPU 402 (or other components of exemplary system 400) may be used as long as CPU 402 (and other components of system 400) supports the inventive operations as described herein. The CPU 402 may execute the various logical instructions according to disclosed aspects and methodologies. For example, the CPU 402 may execute machine-level instructions for performing processing according to aspects and methodologies disclosed herein. In addition, a computer system 400 may also include a graphical processing unit(s) (GPU(s)) 414.

The computer system 400 may also include computer components such as a random access memory (RAM) 406, which may be SRAM, DRAM, SDRAM, or the like. The computer system 400 may also include read-only memory (ROM) 308, which may be PROM, EPROM, EEPROM, or the like. RAM 406 and ROM 408 hold user and system data and programs, as is known in the art. The computer system 400 may also include an input/output (I/O) adapter 410, a communications adapter 422, a user interface adapter 424, and a display adapter 418. The I/O adapter 410, the user interface adapter 424, and/or communications adapter 422 may, in certain aspects and techniques, enable a user to interact with computer system 400 to input information.

The I/O adapter 410 preferably connects a storage device(s) 412, such as one or more of hard drive, compact disc (CD) drive, floppy disk drive, tape drive, etc. to computer system 400. The storage device(s) may be used when RAM 406 is insufficient for the memory requirements associated with storing data for operations of embodiments of the present techniques. The data storage of the computer system 400 may be used for storing information and/or other data used or generated as disclosed herein. The communications adapter 422 may couple the computer system 400 to a network (not shown), which may enable information to be input to and/or output from system 400 via the network (for example, a wide-area network, a local-area network, a wireless network, any combination of the foregoing). User interface adapter 424 couples user input devices, such as a keyboard 428, a pointing device 426, and the like, to computer system 400. The display adapter 418 is driven by the CPU 402 to control, through a display driver 416, the display on a display device 420.

The architecture of system 400 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such as a set of instructions or code that, when executed, performs the instructions or operations from memory. By way of example, the computer system includes a processor; an input device and memory. The input device is in communication with the processor and is configured to receive input data associated with a subsurface region. The memory is in communication with the processor and the memory has a set of instructions, wherein the set of instructions, when executed, are configured to: obtain a first data set associated with a subsurface region, wherein the two or more reservoir models are based on a first data set; create two or more reservoir models for a subsurface region from the first data set; obtain a second data set associated with a subsurface region and the two or more reservoir models; obtain production data associated with a subsurface region; dispose the production data and at least a portion of the second data set into a feature space; determine a region of interest within the feature space; evaluate the region of interest or a business-relevant metric in the feature space; and determine whether to perform a hydrocarbon operation based on the evaluation of the region of interest or of the business-relevant metric.

The system may include various enhancements. For example, the system may include the set of instructions, when executed by the processor, configured to: perform one or more regression techniques to evaluate the region of interest; wherein the first data set may comprise one of seismic data, well test data, well log data, production data, and any combination thereof; wherein the second data set may comprise one of generated or observed seismic data, generated or observed well log data, generated or observed well test data, generated or observed production data and any combination thereof; may simulate each of the two or more reservoir models with the hydrocarbon operation being performed to create first simulation results, may simulate each of the two or more reservoir models with the hydrocarbon operation not being performed to create second simulation results, wherein the second data set may comprise the first simulation results and the second simulation results; transform the second data set to alter dimensionality of the second data set, or portion of the second data set, prior to disposing the second data set, or a portion of the second data set, into the feature space; wherein the hydrocarbon operation may comprise adding a new well to access the subsurface region.

Further in other configurations, while the second data set (e.g., data set B) may contain production data (for instance in the hydrocarbon production applications), it does not need to contain production data. Thus, in the hydrocarbon development application, the second data set (e.g., data set B) may be limited to well log and well test data from appraisal wells, because in this example there is no production data. Alternatively, certain examples may involve using production data in the first data set (e.g., data set A), such as production data up to a certain time that is used to condition the initial ensemble of reservoir models, for example.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method for evaluating and performing a hydrocarbon operation for a subsurface region comprising:
    obtaining a first data set associated with a subsurface region;
    obtaining a metric for an operational decision;
    creating two or more reservoir models for the subsurface region, wherein the two or more reservoir models are based on the first data set;
    obtaining a second data set associated with the subsurface region and the two or more reservoir models;
    transforming the second data set to alter dimensionality of at least a portion of the second data set;
    creating a feature space and defining a plurality of elements of the feature space corresponding to each reservoir model;
    obtaining production data associated with the subsurface region;
    disposing at least a portion of the production data and at least a portion of the transformed second data set into the feature space;
    determining a region of interest within the feature space;
    evaluating the metric for the operational decision at the region of interest in the feature space; and
    determining whether to perform a hydrocarbon operation based on the evaluation of the metric for the operational decision at the region of interest.

2. The method of claim 1, further comprising performing one or more mathematical, statistical, or machine learning techniques combined with reservoir model simulation data, model-form error and metrics to evaluate the metric at the region of interest.

3. The method of claim 1, wherein the first data set comprises one of seismic data, well log data, well test data, production data, and any combination thereof.

4. The method of claim 1, wherein the second data set comprises one of generated or observed seismic data, generated or observed well log data, generated or observed well test data, generated or observed production data, and any combination thereof.

5. The method of claim 1, further comprising:
    simulating each of the two or more reservoir models to create simulation results;
    wherein the second data set comprises the simulation results.

6. The method of claim 1, further comprising:
    simulating each of the two or more reservoir models with the hydrocarbon operation being performed to create first simulation results;
    simulating each of the two or more reservoir models with the hydrocarbon operation not being performed to create second simulation results;
    wherein the metric for the operational decision is determined from the first simulation results and the second simulation results.

7. The method of claim 1, wherein the hydrocarbon operation comprises adding a new well to access the subsurface region.

8. The method of claim 1, wherein the second data set comprises one of generated or observed well log and generated or observed well test data from appraisal wells.

9. The method of claim 1, wherein the metric of operational decision is used to determine fidelity of the reservoir models.

10. A system for evaluating and performing a hydrocarbon operation for a subsurface region, comprising:
    a processor;
    an input device in communication with the processor and configured to receive input data associated with a subsurface region;
    memory in communication with the processor, the memory having a set of instructions, wherein the set of instructions, when executed by the processor, are configured to:
        obtain a first data set associated with a subsurface region;
        create two or more reservoir models for the subsurface region, wherein the two or more reservoir models are based on the first data set;
        obtain a second data set associated with the subsurface region and the two or more reservoir models;
        transform the second data set to alter dimensionality of at least a portion of the second data set;
        obtain production data associated with the subsurface region;
        dispose at least a portion of the production data and at least a portion of the second data set into a feature space;
        determine a region of interest within the feature space;
        evaluate a decision metric at the region of interest in the feature space; and
        determine whether to perform a hydrocarbon operation based on the evaluation of the decision metric at or in the neighborhood of the region of interest.

11. The system of claim 10, wherein the set of instructions, when executed by the processor, are further configured to: perform one or more regression techniques to evaluate the decision metric at the region of interest.

12. The system of claim 10, wherein the first data set comprises one of seismic data, well log data, well test data, production data, and any combination thereof.

13. The system of claim 10, wherein the second data set comprises one of generated or observed seismic data, generated or observed well log data, generated or observed well test data, generated or observed production data, and any combination thereof.

14. The system of claim 10, wherein the set of instructions, when executed by the processor, are further configured to
    simulate each of the two or more reservoir models to create simulation results;
    wherein the second data set comprises the simulation results.

15. The system of claim 10, wherein the set of instructions, when executed by the processor, are further configured to
    simulate each of the two or more reservoir models with the hydrocarbon operation being performed to create first simulation results;

simulate each of the two or more reservoir models with the hydrocarbon operation not being performed to create second simulation results;
wherein the decision metric is determined from the first simulation results and the second simulation results.

16. The system of claim 10, further comprising transforming the second data set to incorporate additional information corresponding to later times prior to disposing the at least a portion of the second data set into the feature space.

17. The system of claim 10, wherein the hydrocarbon operation comprises adding a new well to access the subsurface region.

* * * * *